United States Patent [19]

Iizuka et al.

[11] Patent Number: 5,278,764

[45] Date of Patent: Jan. 11, 1994

[54] AUTOMATIC BRAKING SYSTEM WITH PROXIMITY DETECTION TO A PRECEDING VEHICLE

[75] Inventors: Haruhiko Iizuka; Kunihiko Kurami, both of Kanagawa, Japan

[73] Assignee: Nissan Motor Company, Limited, Japan

[21] Appl. No.: 646,543

[22] Filed: Jan. 28, 1991

[30] Foreign Application Priority Data

Jan. 29, 1990 [JP] Japan .................................. 2-16280

[51] Int. Cl.$^5$ .............................................. B60T 8/32
[52] U.S. Cl. .................................... 364/461; 364/460; 364/424.05; 303/101; 340/903; 180/170
[58] Field of Search ................. 364/424.01, 426.01, 364/426.04, 460, 461, 424.05; 180/167, 171, 170, 100, 101; 340/903, 904; 303/100, 101

[56] References Cited

U.S. PATENT DOCUMENTS

| | | | |
|---|---|---|---|
| 4,073,359 | 2/1978 | Fujiki et al. | 180/169 |
| 4,079,802 | 3/1978 | Kawata | 180/169 |
| 4,097,864 | 6/1978 | Endo et al. | 342/71 |
| 4,621,705 | 11/1986 | Etoh | 180/169 |
| 4,628,317 | 12/1986 | Nishikawa et al. | 340/903 |
| 4,760,529 | 6/1988 | Takata et al. | 364/426.04 |
| 4,833,469 | 3/1989 | David | 340/903 X |
| 5,014,200 | 5/1991 | Chundrlik et al. | 364/426.04 |
| 5,053,979 | 10/1991 | Etoh | 364/424.01 X |
| 5,189,619 | 2/1993 | Adachi et al. | 364/426.04 |

FOREIGN PATENT DOCUMENTS

| | | |
|---|---|---|
| 2513517 | 3/1975 | Fed. Rep. of Germany . |
| 55-110647 | 8/1980 | Japan . |
| 1464317 | 2/1977 | United Kingdom . |

*Primary Examiner*—Vincent N. Trans
*Attorney, Agent, or Firm*—Lowe, Price, LeBlanc & Becker

[57] ABSTRACT

An automatic braking system for a vehicle is provided. This system includes generally a speed sensor for monitoring speed of the vehicle and a distance sensor for monitoring a distance between the vehicle and the preceding vehicle. The system determines a marginal time required for the vehicle to collide with the preceding vehicle based on speed relative to the preceding vehicle and the distance to the preceding vehicle to automatically actuate a brake when the marginal time is shorter than a preselected marginal time.

34 Claims, 11 Drawing Sheets

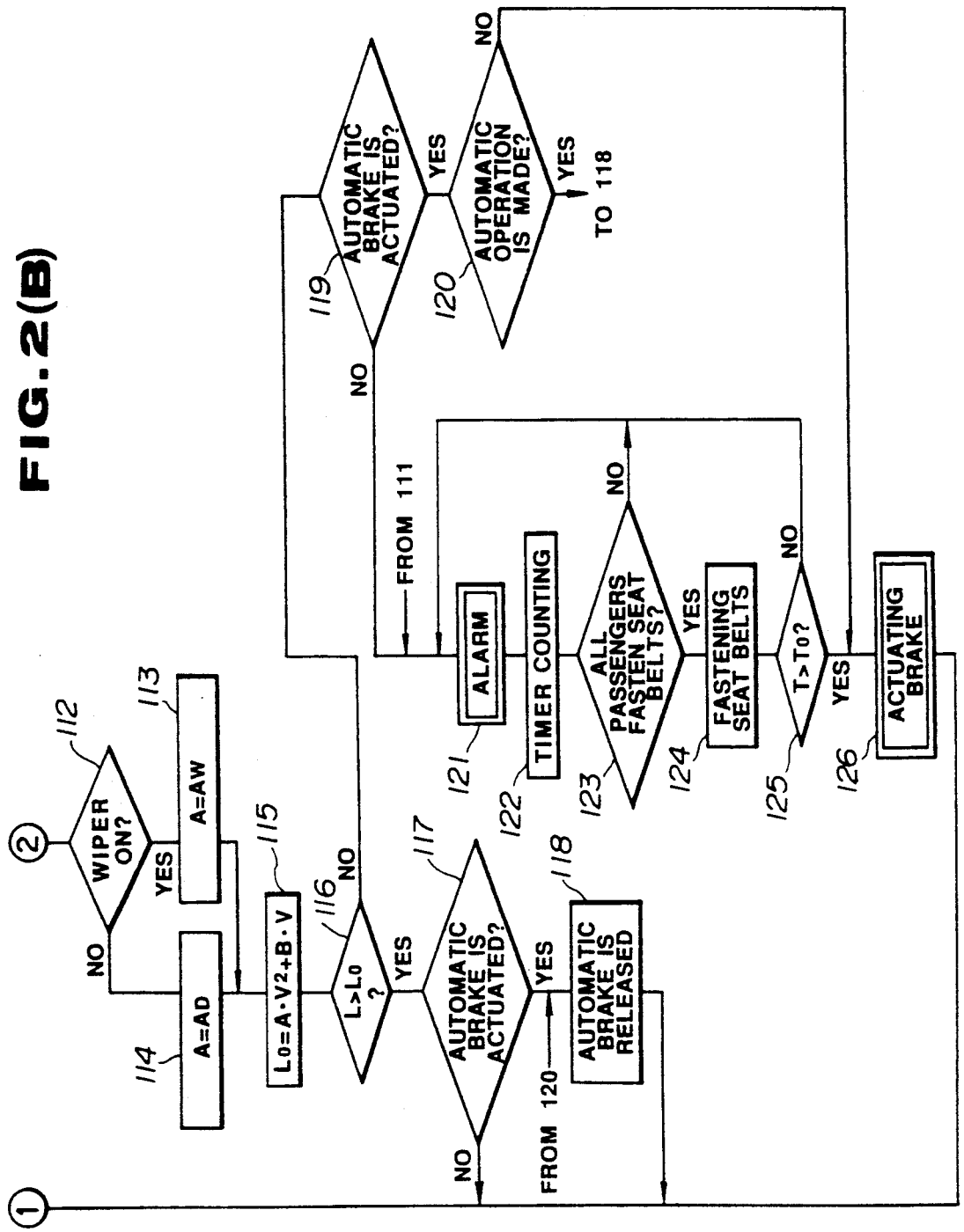

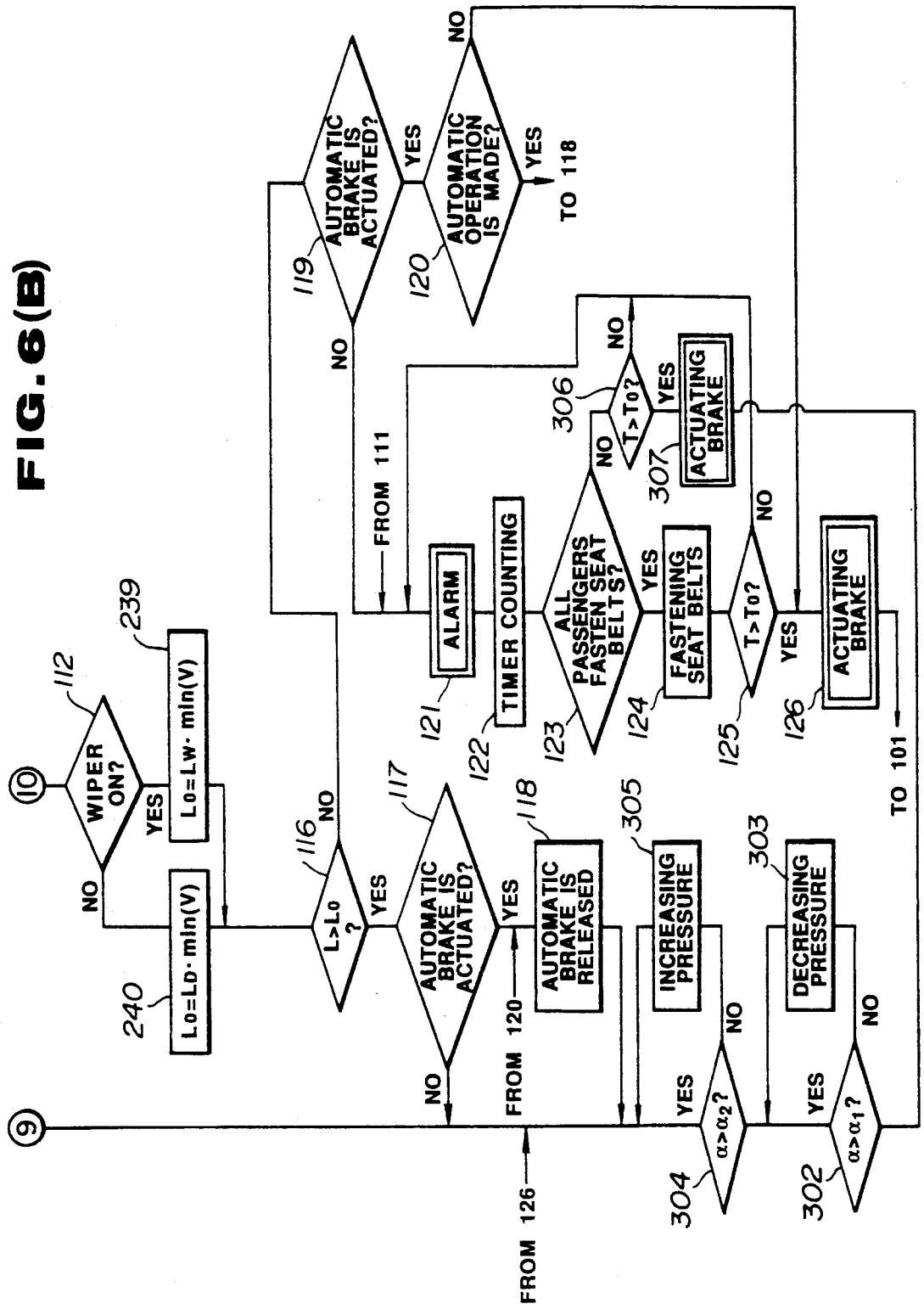

AUTOMATIC BRAKING SYSTEM WITH PROXIMITY DETECTION TO A PRECEDING VEHICLE

BACKGROUND OF THE INVENTION

1. Technical Field

The present invention relates generally to an automatic braking system for a vehicle. More particularly, the invention relates to an automatic braking system for a vehicle which is operable to automatically change timing of braking operation dependent upon road conditions or driving characteristics of a driver when the vehicle is close approaching a preceding vehicle.

2. Background Art

Japanese Patent First Publication No. 55-110647 discloses an automatic braking system. This system is operable to detect a distance between the vehicle in which the system is installed and a preceding vehicle by means of an ultrasonic generator, to automatically actuate a brake to assure passenger safety when the vehicle approaches the preceding vehicle within a preselected distance.

However, in the prior art automatic braking system, the braking is automatically actuated according to fixed parameters independent of the driving technique of a driver or variable driving conditions. Therefore, the system sometimes operates to automatically actuate the brake although the driver has given sufficient attention to forward traffic conditions and the vehicle does not require braking.

SUMMARY OF THE INVENTION

It is accordingly one object of the present invention to avoid the disadvantages of the prior art.

It is another object of the invention to provide a braking system for a vehicle which is operable to automatically actuate a brake, in accordance with the driving technique of a driver or driving conditions such as road conditions, to assist the driver in driving without causing discomfort to vehicle occupants.

According to one aspect of the present invention, there is provided a braking system for a vehicle which comprises a first means for monitoring the vehicle speed to provide a signal indicative thereof, a second means for monitoring a distance between the vehicle and a preceding vehicle to provide a signal indicative thereof, a third means for monitoring speed relative to the preceding vehicle to provide a signal indicative thereof, a fourth means for determining a marginal time required for the vehicle to collide with the preceding vehicle based on the relative speed derived by the third means and the distance to the preceding vehicle derived by the second means and providing a signal indicative thereof, and a sixth means responsive to the signal indicative of the marginal time from the fourth means shorter than a preselected marginal time for automatically actuating a brake for reducing the speed of the vehicle.

According to another aspect of the invention, there is provided an automatic braking system for a vehicle which comprises a first means for monitoring vehicle speed to provide a signal indicative thereof, a second means for monitoring a distance between the vehicle and a preceding vehicle to provide a signal indicative thereof, a third means for monitoring speed relative to the preceding vehicle to provide a signal indicative thereof, a fourth means for determining a marginal time required for the vehicle to collide with the preceding vehicle based on the relative speed derived by the third means and the distance to the preceding vehicle derived by the second means and providing a signal indicative thereof, a sixth means including a memory for storing a minimum value of the marginal time during braking operated by a driver determined by said fourth means, and a seventh means responsive to the signal indicative of the marginal time from the fourth means shorter than the minimum value of the marginal time stored in the memory of the sixth means for automatically actuating a brake for reducing the speed of the vehicle.

BRIEF DESCRIPTION OF THE DRAWINGS

FIGS. 2A and 2B are flowcharts of a program or sequence of logical steps, performed by an automatic braking system of the invention.

FIGS. 3A, 3B, 4A, 4B, 5A, 5B, 6A and 6B are flowcharts of programs performed by alternate embodiments of the automatic braking system of the invention.

DESCRIPTION OF THE PREFERRED EMBODIMENT

Figure 1:
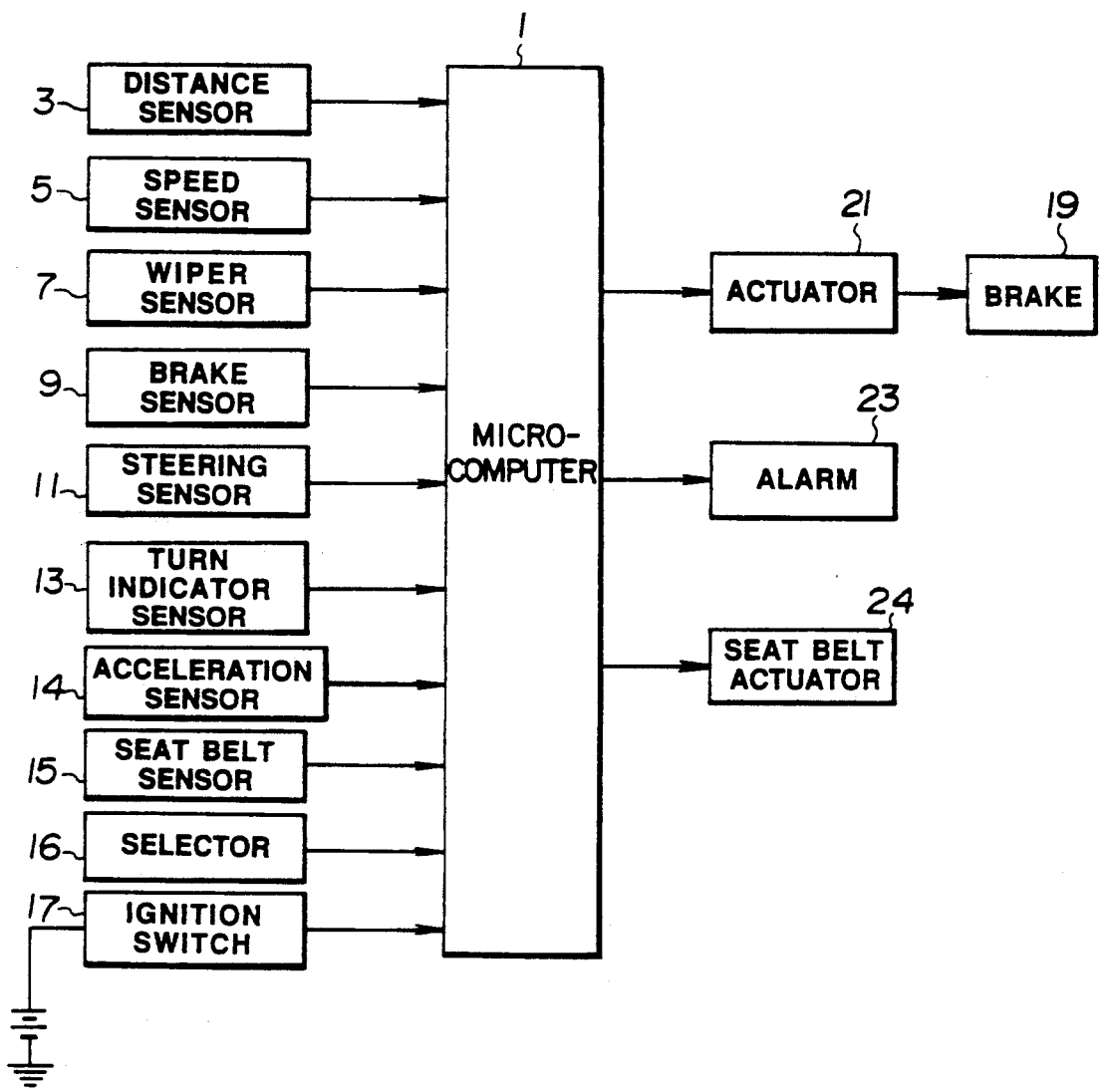
FIG. 1 is a block diagram which shows an automatic braking system of the invention.

Referring now to the drawings, particularly to FIG. 1, an automatic braking system according to the present invention is shown which includes a microcomputer 1. This microcomputer 1 is operable to control operation of a brake 19, detect vehicle speed relative to the preceding vehicle, determine driving characteristics, and detect close proximity to the preceding vehicle.

The braking system further includes a distance sensor 3 for sensing a distance L between the system vehicle and a preceding vehicle and a vehicle speed sensor 5 for monitoring a system vehicle speed v which are connected to input ports of the microcomputer 1. The distance sensor 3 may be provided with an ultrasonic transmitter-receiver for example which determines a distance between the system vehicle and the preceding vehicle based on a period of time required f 0 r receiving an ultrasonic wave reflected from the preceding vehicle. The vehicle speed sensor may be provided a speedometer. The braking system further includes a wiper sensor 7 and a brake sensor 9. The wiper sensor 7 is responsive to ON or OFF switching signals of a wiper switch to detect operation of a wiper for functioning as a road condition sensor which determines road conditions such as a friction coefficient of a road surface. The brake sensor 9 is responsive to ON or OFF signals of a brake switch which operates in association with motion of a brake pedal to detect operation of the brake 19. The braking system further includes a steering wheel sensor 11, a turn indicator sensor 13 for sensing operation of a turn indicator, an acceleration sensor 14 for sensing operation of an acceleration pedal, a seat belt sensor 15 for sensing use of a seat belt, a selector 16 for selecting parameters of driving characteristics associated with individual drivers, and an ignition key switch 17 which are connected to input ports of the microcomputer 1. The steering wheel sensor 11 is responsive to turning of a steering wheel over a preselected angle to output a signal indicative thereof.

Connected to output ports of the microcomputer 1 are a hydraulic actuator 21 for the brake 19, an alarm 23 which sounds a buzzer, for example, to give an alarm signal to a driver, and a seat belt actuator 24 which further fastens seat belts to hold passengers in their seats according to a command signal from the microcomputer when passenger seat belts are fastened.

In operation, a distance $L_o$ required for stopping a vehicle by braking operation after a driver notices that a preceding vehicle is in close proximity is equal to the sum of a free running distance $L_B$ for which the vehicle travels until depression of the brake pedal after the notice of danger and a braking distance $L_A$ for which the vehicle travels until the vehicle is stopped after braking operation.

The free running distance $L_B$ is proportional to the vehicle speed v and given by a relation of $L_B = B \times V$ where the B is a constant of proportion.

The braking distance $L_A$ varies directly as square of the vehicle speed V and given by a relation of $L_A = A \times V^2$ where the A is a constant of proportion.

Thus, a stopping distance $L_o$ is represented by the following equation.

$$L_o = L_A + L_B = A \times V^2 + B \times V$$

Where the constant of proportion A is proportional to a friction coefficient p between a road surface and a tire of the vehicle. The constant of proportion A is thus variable between $A_W$, in a case of a low friction coefficient under rainy (wet) driving conditions, or $A_D$, under dry driving conditions.

When the distance L to the preceding vehicle monitored by the distance sensor 3 is shorter than the stopping distance $L_o$, the alarm 23 generates an alarm signal to inform the driver of close proximity to the preceding vehicle. Afterward, if the driver does not act in order to avoid danger after a preselected time (for example one minute), the microcomputer actuates the brake 19 to reduce vehicle speed for avoiding a collision with the preceding vehicle.

Assuming that a period of time until a collision with the preceding vehicle is a marginal time T, this time T is expressed by the following relation.

$$T = L/(V - V_F)$$

Where the $V_F$ is vehicle speed of the preceding vehicle, the $(V - V_F)$ is speed of the system vehicle relative to the preceding vehicle which may be derived by differentiating the distance L to the preceding vehicle with respect to time.

It is also dangerous when the marginal time T is shorter than a preselected time $T_{10}$. The alarm 23 outputs the alarm signal and the automatic brake 19 is actuated after a preselected time.

Figure 2A:
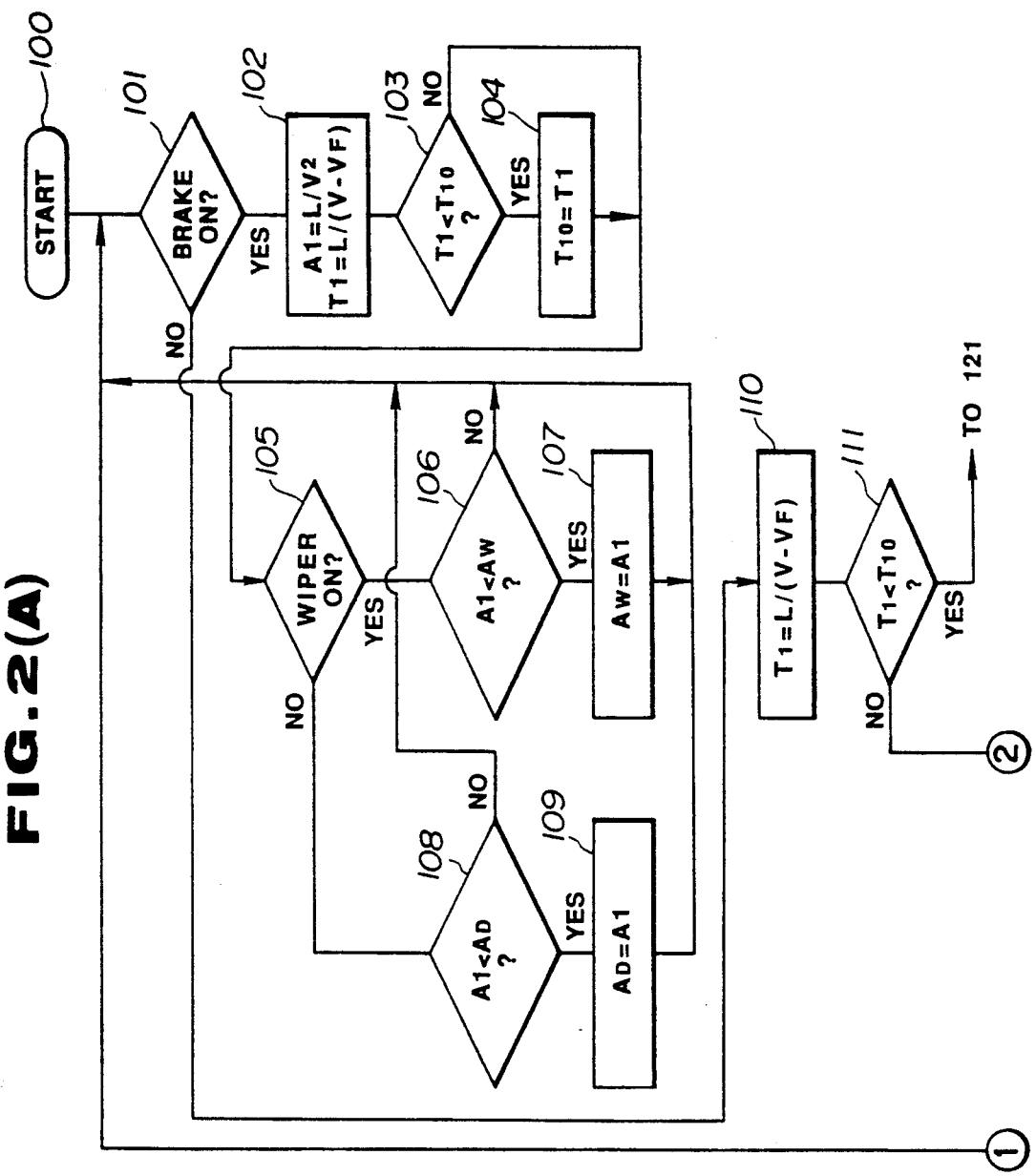

Referring to FIG. 2, there is shown a flowchart of a program or sequence of logical steps performed by the automatic braking system of the invention. The program starts in response to an ON signal of the ignition switch 17 input to the microcomputer 1.

After entering the program in step 100, the routine proceeds to step 101 wherein it is determined as to whether the driver depresses the brake pedal or not based on the signal from the brake sensor 9. If a YES answer is obtained, it is concluded that the driver drives with sufficient attention to forward traffic and the routine then proceeds to step 102 wherein a minimum value $A_1$ of the constant of proportion A of the braking distance $L_A$ equation during braking is determined based on a distance to the preceding vehicle L and vehicle speed V and is stored in a memory. Additionally, a minimum value $T_1$ of the marginal time during braking operation is determined based on the distance to the preceding vehicle L and speed relative to the preceding vehicle $(V - V_F)$. The routine then proceeds to step 103 wherein it is determined as to whether the marginal time $T_1$ is shorter than a set value of the marginal time $T_{10}$. If a YES answer is obtained, the routine proceeds to step 104 wherein the set value of marginal time $T_{10}$ is set to the marginal time $T_1$ and is stored in a memory.

Different drivers have their own estimations of a safe stopping difference between their vehicle and a preceding one. The minimum values of the constant of proportion A and the marginal time are provided to be used as control parameters for operating the automatic brake 19. The minimum values $A_1$ and $T_1$ are established dependent upon the driving technique of individual drivers and traffic conditions and thus these may correspond to driving characteristics of the individual drivers.

The routine then proceeds to step 105 wherein it is determined as to whether a wiper is operated or not based on a signal from the wiper sensor 7 for determining whether a road surface is in a slippery condition due to rain or not. If a YES answer is obtained, it is concluded that a friction coefficient of the road surface is low and the routine then proceeds to step 106 wherein the constant of proportion $A_1$ derived by step 102 is compared with the preselected constant of proportion $A_W$ which is provided for wet conditions. If the $A_1$ is smaller than the $A_W$, the routine proceeds to step 107 wherein the constant of proportion $A_W$ is set to the $A_1$ and is stored in the memory. On the other hand, if a NO answer is obtained in step 105, it is concluded that the road surface is dry and the routine proceeds to step 108 wherein it is determined as to whether the constant of proportion $A_1$ is smaller than the $A_D$ which is provided for dry conditions. If a YES answer is obtained, the routine proceeds to step 109 wherein the $A_D$ is updated as the A value and stored in memory. Therefore, it is appreciated that the above steps determine a value of the constant of proportion A depending upon road conditions in addition to determination of the driving characteristics of the driver.

If a NO answer is obtained in step 101, the routine proceeds to step 110 wherein the marginal time $T_1$ is determined based on the distance to the proceeding vehicle L and the relative speed $(V - V_F)$ at that time. The routine then proceeds to step 111 wherein it is determined whether the marginal time $T_1$ is smaller than the set value of marginal time $T_{10}$. If a NO answer is obtained, it is concluded that there is sufficient time for avoiding collision with the preceding vehicle and the routine proceeds to step 112 without an alarm to the driver.

In step 112, it is determined as to whether tile wiper is operated or not. If a YES answer is obtained, the routine proceeds to step 113 wherein the constant of proportion A is set to $A_W$ anticipate wet road conditions. If a NO answer is obtained, the routine proceeds to step 114 wherein the constant of proportion A is set to $A_D$ according to dry road conditions.

The routine then proceeds to step 115 wherein the stopping distance $L_o$ is mathematically calculated according to the following equation.

$$L_o = A \times V^2 + B \times V$$

The routine proceeds to step 116 wherein it is determined as to whether the distance to the preceding vehicle L is greater than the stopping distance $L_o$ or not. If a YES answer is obtained, it is concluded that there is a sufficient distance between the vehicles and the routine proceeds to step 117 wherein it is determined as to whether the automatic brake 19 is to be operated or not based on the signal output from the brake sensor 9. If a YES answer is obtained, the routine proceeds to step 118 wherein operation of the automatic brake 19 is released and the routine returns to step 101. The release of the brake 19 is effected when the distance to the preceding vehicle L becomes greater than the stopping distance $L_o$. The releasing operation may be carried out gradually.

If a NO answer is obtained in step 117, the routine directly returns to step 101.

If a NO answer is obtained in step 116, it is concluded that the vehicle is close approaching the preceding vehicle and the routine proceeds to step 119 wherein it is determined as to whether the automatic brake 19 is operated or not based on the signals output from the brake sensor 9. If a YES answer is obtained, the routine proceeds to step 120 wherein it is determined as to whether anti-collision operations, such as steering over a preselected angle, turn indicator operation, or acceleration operation are carried out or not based on the signals output from the steering sensor 11, the turn indicator sensor 13, or the acceleration sensor 14. If a YES answer is obtained, the routine proceeds to step 118 wherein the automatic braking operation of the brake 19 is released and returns to step 101. Additionally, if an anti-collision operation is carried out suddenly over a preselected degree, the automatic braking operation may be maintained for preventing further danger from occurring. If a NO answer is obtained in step 120, it is concluded that the driver does not perceive that the vehicle is close approaching the preceding vehicle and the routine proceeds to step 1 2 6 wherein the automatic braking operation of the brake 19 is maintained.

If a NO answer is obtained in step 119 in a case, for example, where the driver drives while looking aside, the routine proceeds to step 121 wherein the alarm 23 is actuated to inform the driver that the vehicle is in dangerous proximity to the preceding vehicle. Additionally, in step 111 the marginal time T shorter than the preselected marginal time $T_{10}$ indicates close proximity to the preceding vehicle with insufficient time for avoiding collision therewith, the routine proceeds to step 121 wherein the alarm 23 is also actuated to output an alarm signal to the driver.

The routine then proceeds to step 122 wherein a timer starts to count in response to the alarm signal provided in step 21. Simultaneously, in step 123 it is determined as to whether all passengers fasten seat belts respectively or not. If a YES answer is obtained, the routine proceeds to step 124 wherein the seat belts are further fastened to hold the passengers firmly against their respective seats. The routine then proceeds to step 125 wherein it is determined as to whether time T after outputting the alarm signal reaches a preselected period of time $T_o$ or not. If a YES answer is obtained which represents that the driver has not depressed the brake pedal within the preselected time $T_o$, the routine proceeds to step 126. In step 126, the automatic brake 19 is actuated to reduce the vehicle speed for preventing the vehicle from colliding with the preceding vehicle.

If a NO answer is obtained in step 123, the routine backs to step 121 wherein the alarm 23 is operated to urge the passengers to fasten the seat belt. This results in a high fastening rate of the seat belt. Alternatively, if a NO answer is obtained in step 123, the routine may proceed directly to step 125 and then the automatic brake 19 is actuated in step 126 after the preselected period of time $T_o$.

It is preferable that the preselected period of time $T_o$ after the alarm 23 is actuated is variable so as to be inversely proportional to a difference between the marginal time $T_1$ and the set value of marginal time $T_{10}$ as well as a fixed period of time. The marginal time $T_1$ considerably shorter than the set value of marginal time $T_{10}$ representing that in which the vehicle has no time to avoid collision with the preceding vehicle. In this situation, for example, alarm sounds having a relatively high frequency may be generated intermittently for warning the driver of a higher degree of emergency than the simple alarm signal.

With the above system, it will be appreciated that when the vehicle is close approaching a preceding vehicle due to a driver looking aside, or sudden braking of the preceding vehicle, the brake 19 is automatically actuated to reduce vehicle speed with an alarm being raised to the driver. Further, determination of close proximity to the preceding vehicle is established in view of normal driving technique of the driver. Thus, the determination of close proximity is variable dependent upon the driving technique or driving status of the vehicle to provide automatic braking operation comfortable to a driver. In addition, when the driver proceeds safely, or while perceiving forward traffic, the automatic brake 19 is not operated to give comfortable, not intrusive, driving assistance to the driver.

Figure 3A:
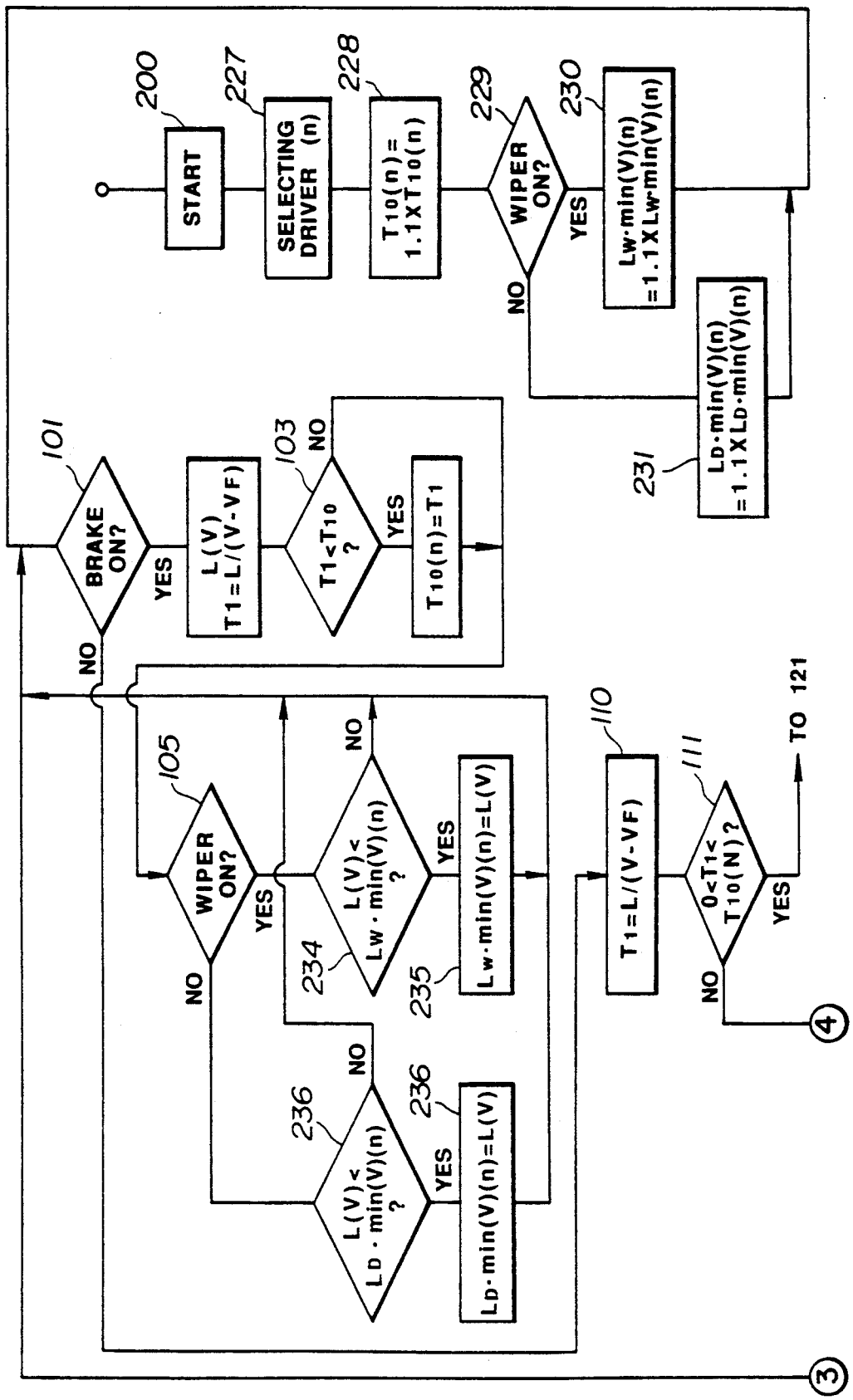
Figure 3B:
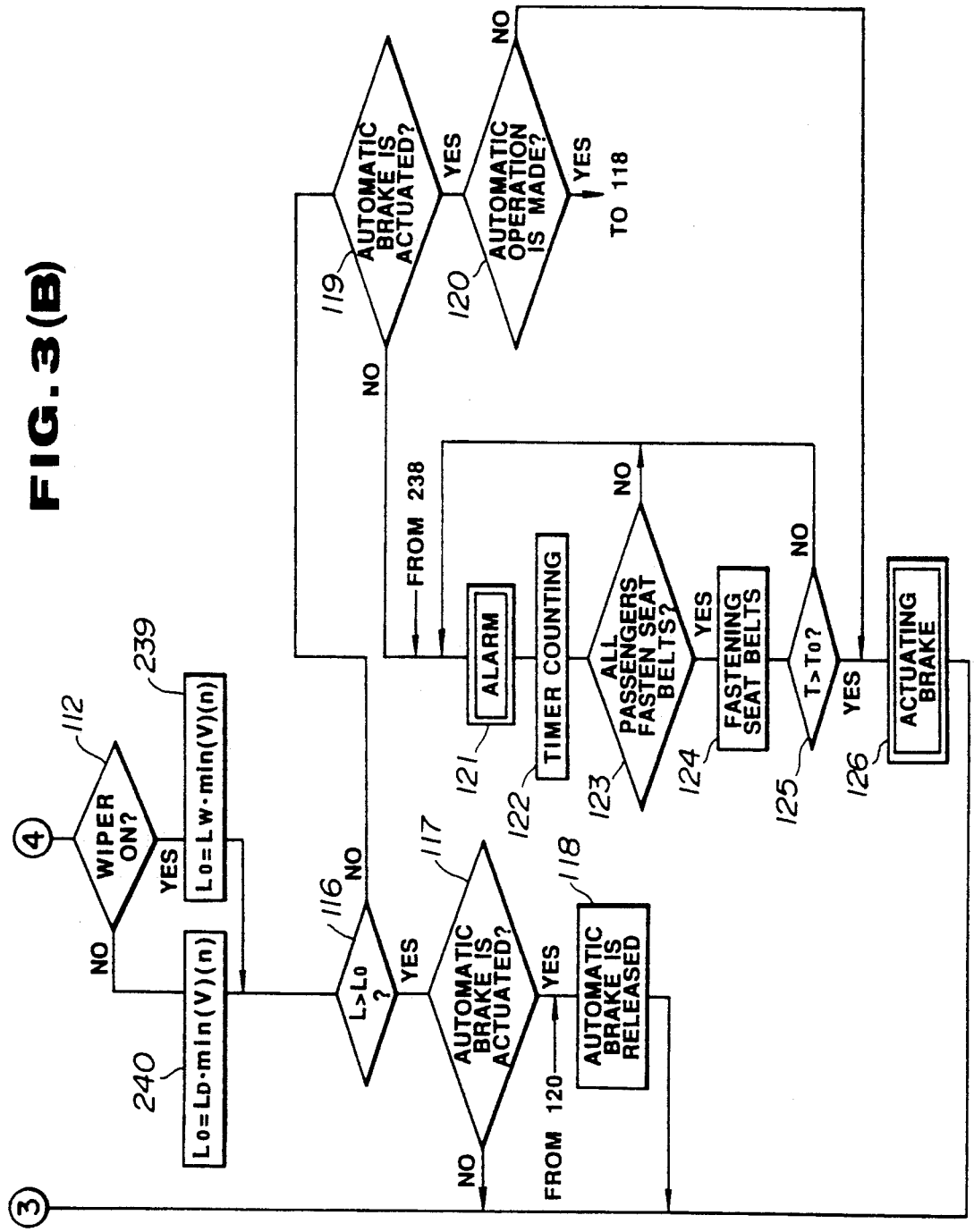

Referring to FIG. 3, a flowchart of a program or sequence of logical steps performed by an alternative system according to the invention. In the flowchart, the same numbers as those of FIG. 2 refer to the same steps. Description of those steps will not be mentioned here again in detail.

In the system, in place of memorization of stopping distances $L_o$ utilizing the constants of proportion A and B, a minimum Lmin of a distance to the preceding vehicle L relative to vehicle speed V during braking is stored in a two-dimensional map to be set as stopping distances. Additionally, individual driving characteristics of a plurality of drivers are stored in a memory which are selectable by means of the selector 16 when the driver gets in the vehicle.

After entering the program in step 200, the routine proceeds to step 227 wherein the driver's [n] own driving characteristic is provided in response to switching operation of the selector 16. The routine then proceeds to step 228 wherein the marginal time $T_{10}$ stored in the memory for the driver [n] is multiplied by a fixed value more than 1.0 (for example, 1.1) and is stored in the memory to be updated as a new marginal time $T_{10}$ n. This operation is always executed by utilizing a minimum of the marginal time $T_{10}[n]$ during driving as an alarm set value to prevent the previous minimum value from being used. This is because the marginal time for alarm must be set to a period of time longer than the previous value if current driving reaction of the driver [n] is weaker than before. For these reason, a marginal time relatively greater than the previous value is set at the beginning of driving for providing a new marginal time suitable for current driving ability of the driver.

The routine then proceeds to step 229 wherein it is determined as to whether the wiper is operated or not. If a YES answer is obtained which indicates wet road condition, the routine proceeds to step 230 wherein a set value of a distance to the preceding vehicle Lwmin(V)[n] is read out and multiplied by a fixed value more than 1.0 (for example, 1.1) to be updated as a new set value Lwmin(v)[n]. If a NO answer is obtained which represents that a road surface is dry, the routine proceeds to step 231 wherein a set value of a distance to the preceding vehicle Ldmin(V)[n] is read out and multiplied by a fixed value more than 1.0 (for example, 1.1) to be updated as a new set value Ldmin(V)[n].

The routine proceeds to step 232 through step 101 wherein a distance to the preceding vehicle L(V) is detected to determine the marginal time $T_1$. In step 233 after executing step 103, a minimum of the marginal time $T_1$ is set to a $T_{10[n]}$. If it is rain, in step 234 after step 105 it is determined as to whether the distance to the preceding vehicle L(V) detected in step 232 is smaller than the set value of the distance to the preceding vehicle Lwmin(V)[n] provided in step 230 or not. If a YES answer is obtained, the routine proceeds to step 235 wherein the value Lwmin(V)[n] is updated to a minimum of the value L(V). If it is determined that it is not raining in step 105, the routine proceeds to step 236 wherein it is determined as to whether the distance to the preceding vehicle L(V) detected in step 232 is smaller than the set value of the distance to the preceding vehicle Ldmin(V)[n] provided in step 231 or not. If a YES answer is obtained, the routine proceeds to step 237 wherein the value Ldmin(V)[n] is updated to the value of L(V) If a NO answer is obtained in step 101, the routine proceeds to steps 239 or 240 through steps 110, 238, and 112 wherein the set values of the distance to the preceding vehicle Lwmin(V)[n] and Ldmin(V)[n] are stored as stopping distances $L_o$ respectively when the driver does not depress the brake pedal.

Subsequently, in step 116 if a distance to the preceding vehicle L detected during driving is shorter than the stopping distance $L_o$, after it is determined that the automatic brake is not actuated in step 119 the routine proceeds to step 121 wherein an alarm is raised to inform the driver that the vehicle is close approaching the preceding vehicle. Additionally, if it is determined that the marginal time $T_1$ during driving is shorter than the set value of marginal time $T_{10}$ [n] in step 238, in step 121 the alarm is given to the driver.

Therefore, the above system further depends on the driving characteristics of the drivers than the system of FIG. 2. Automatic control of braking is established according to driving ability of individual drivers.

Operation of the selector 16 selectable of control parameters associated with the individual drivers may be accomplished by changing seat positions by the drivers. Alternatively, it may be accomplished with IC cards (Identification Card) to identify the drivers.

Figure 4A:
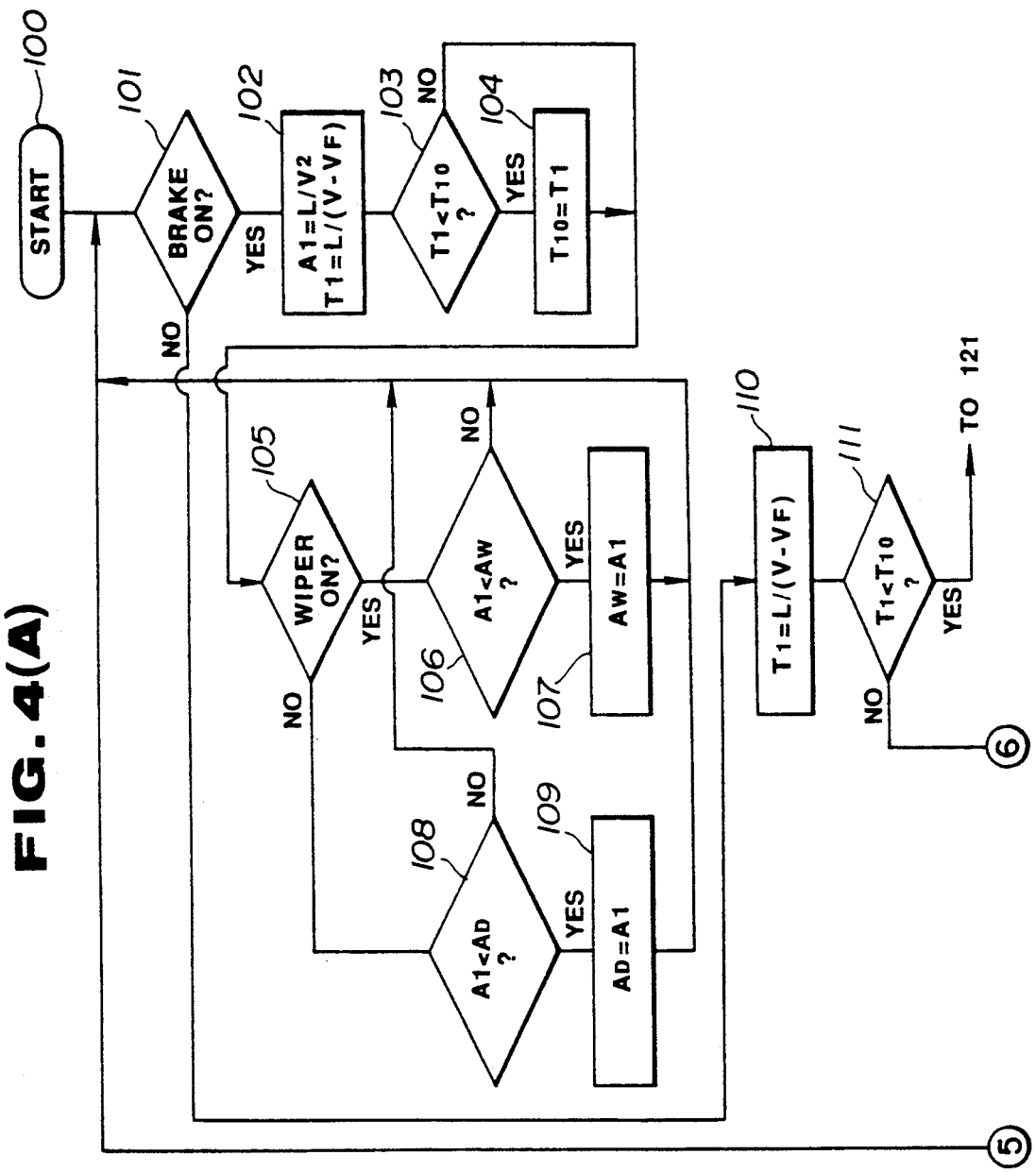
Figure 4B:
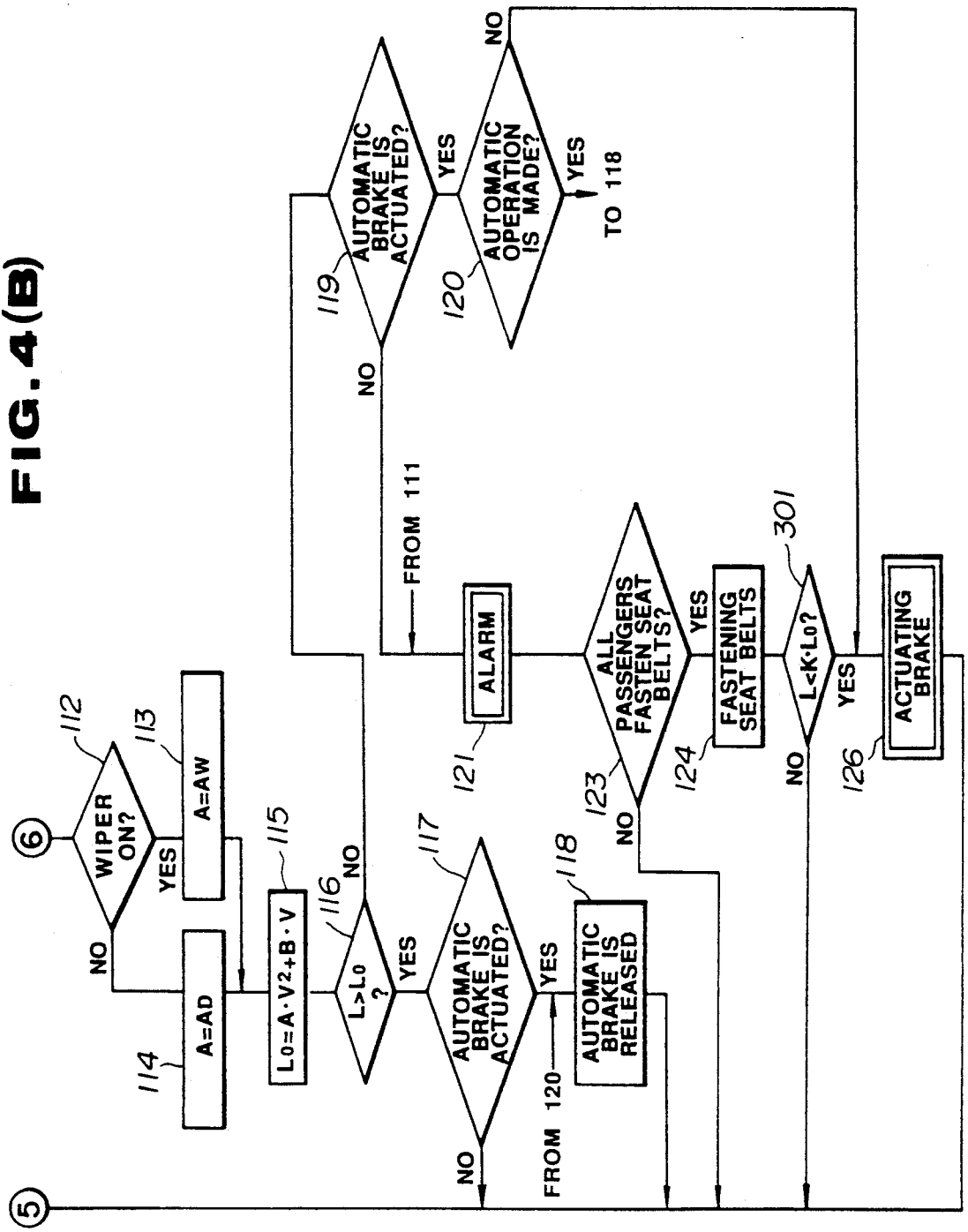

Referring to FIG. 4, a third embodiment of the automatic braking system is shown. In this system, a stopping distance $L_o$ as a set value of a distance to the preceding vehicle for actuating the brake 19 and a set value of a distance to the preceding vehicle for actuating the alarm 23 are provided independently of each other. A flowchart of FIG. 4 is the same as that shown in FIG. 2 to which steps 301 is added and from which steps 122 and 125 are omitted. The flowchart will be not described here in detail.

In the system according to the flowchart, the set value of the distance to the preceding vehicle Lw is provided by multiplying a constant K to conform to a relation of $Lw > L_o$.

With control according to the flowchart, an alarm can be raised early to provide sufficient time for a driver to act for avoiding danger.

Figure 5A:
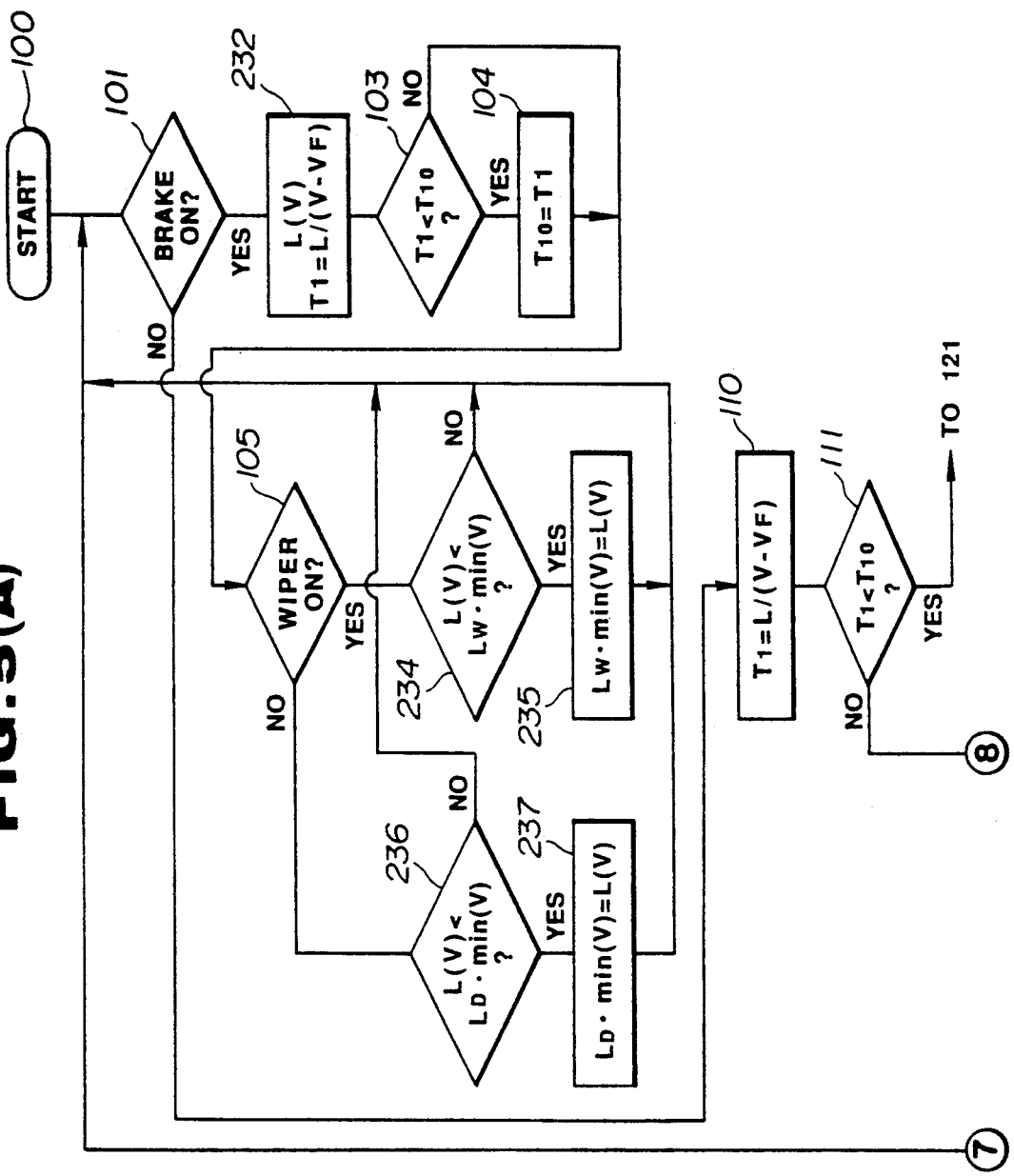
Figure 5B:
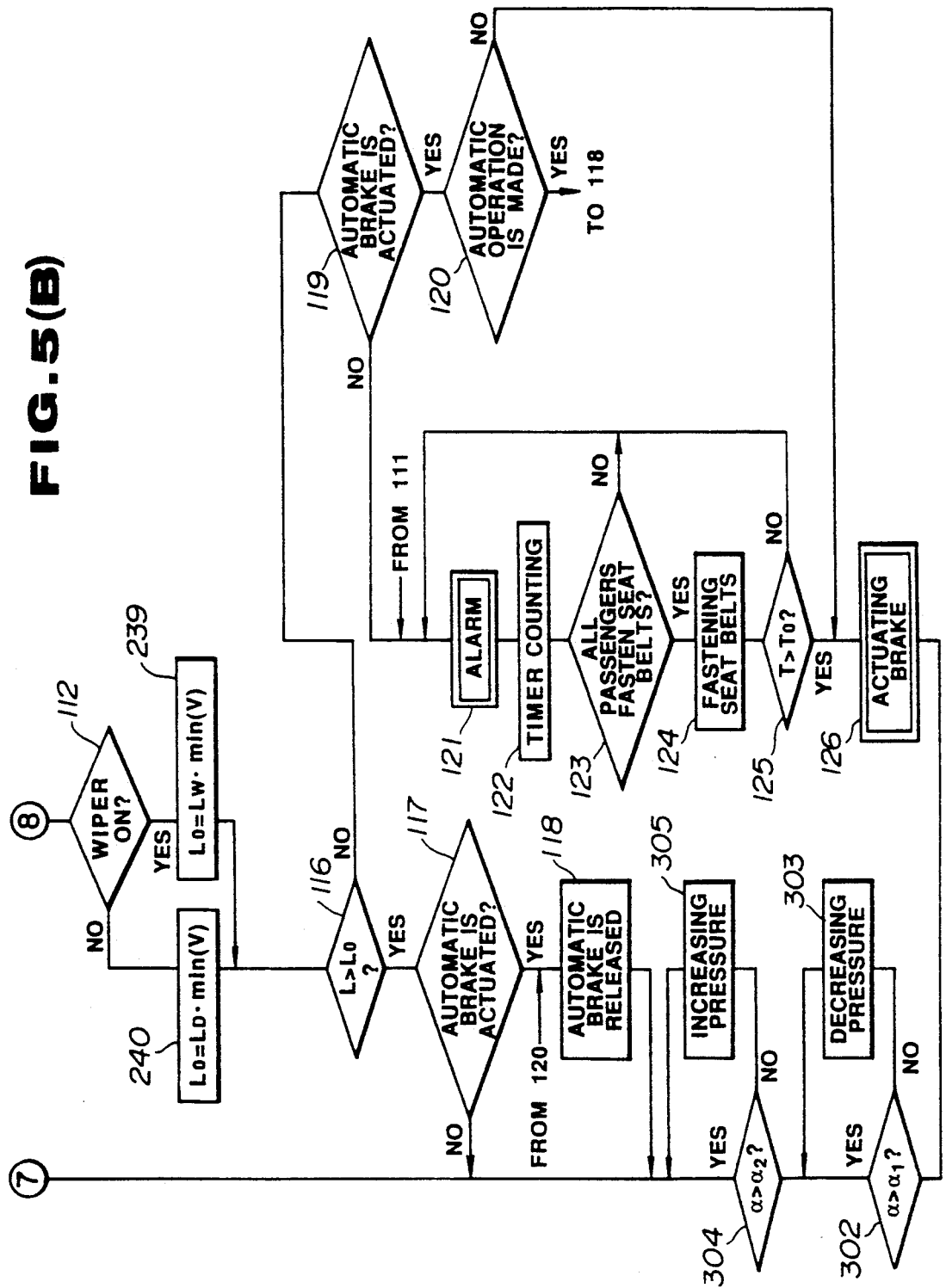

Referring to FIG. 5, a flowchart of a fourth embodiment is shown. A system of this embodiment is operable to control a reduction ratio $\alpha$ of vehicle speed V caused by the automatic brake 19 within a range of preselected values from $\alpha_1$ to $\alpha_2$. This flowchart is the same as that shown FIG. 3 to which steps 302 and 305 are added.

In step 302, it is determined whether the reduction ratio $\alpha$ is greater than the preselected value $\alpha_1$. If a YES answer is obtained, the routine proceeds to step 303 wherein hydraulic pressure supplied to the automatic brake 19 is decreased to reduce braking power thereof. Alternatively, if a NO answer is obtained which represents that the reduction ratio $\alpha$ is smaller than the preselected value $\alpha_2$ in step 304, the routine proceeds to step 305 wherein the hydraulic pressure is increased to build up the braking power.

With this control, the system does not cause discomfort to the driver even if quick reduction of vehicle speed is caused by sudden actuation of the automatic brake 19. Further, a range of the vehicle speed reduction ratio can be determined for reducing vehicle speed at a moment when colliding with a preceding vehicle to minimize the collision impact.

Figure 6A:
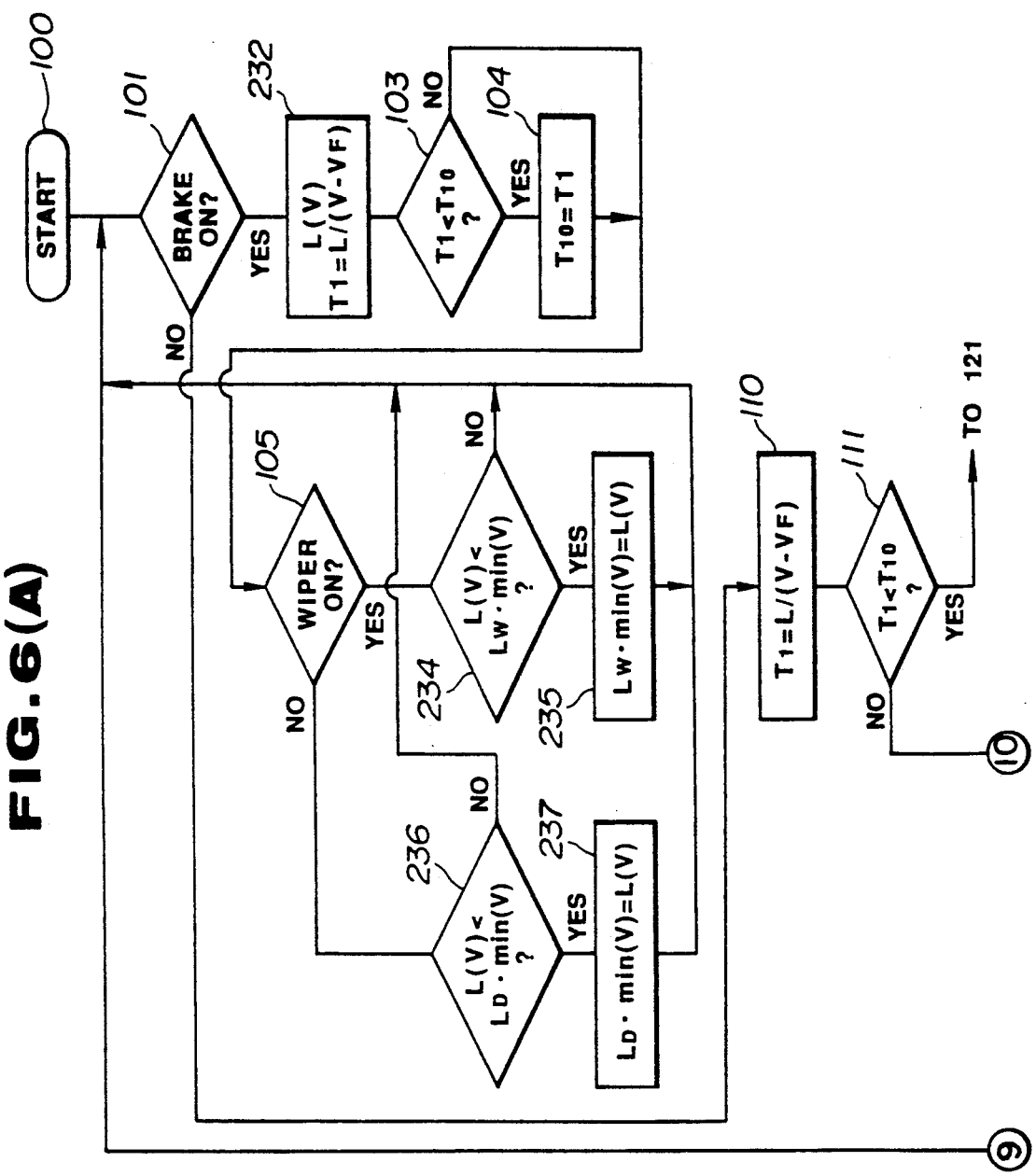

Referring to FIG. 6, a fifth embodiment of a control program of the automatic braking system is shown. The control program is adapted for actuating the automatic brake 19 to automatic emergency braking if all passengers seat belts are fastened, but controlling a vehicle speed reduction ratio similarly to the control as shown in FIG. 5 when a passenger's seat belt is unfastened (see steps 306, 307, 302, 303, 304, and 305).

While in the above embodiments the wiper sensor 7 is utilized for sensing road conditions, a combination of the wiper sensor and an ambient temperature sensor may be used for sensing snow fall to raise an alarm a safely long distance from a preceding vehicle for additional safety. Further, an ultrasonic sensor may be used for sensing a gravel road to raise an alarm a safely long distance from a preceding vehicle.

What is claimed is:

1. A braking system for a vehicle comprising:
   first means for monitoring vehicle speed of a system vehicle incorporating said braking system to provide a signal indicative thereof;
   second means for monitoring a distance between the system vehicle and a preceding vehicle to provide a signal indicative thereof;
   third means for monitoring speed relative to the preceding vehicle to provide a signal indicative thereof;
   fourth means responsive to the signals from said first, second, and third means for providing a preselected braking control parameter indicative of proximity to the preceding vehicle to determine close proximity to the preceding vehicle and for providing a control signal indicative of the close proximity;
   fifth means including a brake unit responsive to said control signal from said fourth means for reducing vehicle speed of the system vehicle;
   sixth means for learning a driver's braking command characteristics based on the preselected braking control parameter determined by said fourth means when a braking operation is effected by the driver; and seventh means for storing the driver's braking command characteristics;

said fourth means comparing the preselected braking control parameter with the driver's braking command characteristics stored in said seventh means to determine the close proximity to the preceding vehicle and to provide said control signal to said fifth means for reducing the speed of the system vehicle.

2. A system as set forth in claim 1, wherein said preselected braking control parameter is a marginal time required for the system vehicle to collide with the preceding vehicle.

3. A system as set forth in claim 2, wherein the driver's braking command characteristics are defined by a preselected marginal time, said sixth means providing the preselected marginal time based on a minimum value of the marginal time determined by said fourth means when the braking operation is effected by the driver, said fourth means comparing the marginal time determined when said brake unit is not operated with the preselected marginal time to determine the close proximity to the preceding vehicle.

4. A system as set forth in claim 3, wherein the preselected marginal time is updated to said minimum value of the marginal time when said minimum value of the marginal time is smaller than a preselected value.

5. A system as set forth in claim 3, wherein said fourth means further provides a braking distance of the system vehicle based on the vehicle speed monitored by said first means and the distance to the preceding vehicle monitored by said second means, said fourth means further determining a stopping distance of the system vehicle based on the braking distance and a free distance dependent upon driving characteristics of the driver, said fourth means being responsive to the signal indicative of the distance to the preceding vehicle monitored by said second means to provide the control signal to said fifth means when the distance to the preceding vehicle is shorter than the stopping distance.

6. A system as set forth in claim 5, wherein said fourth means provides the control signal to said fifth means to actuate the brake unit when the marginal time is greater than the preselected marginal time and the distance to the preceding vehicle monitored by said second means is shorter than the stopping distance.

7. A system as set forth in claim 6, further comprising a seat belt actuator for tightening a fastened seat belt when the marginal time determined by said fourth means is greater than the preselected marginal time and the distance to the preceding vehicle monitored by said second means is shorter than the stopping distance.

8. A system as set forth in claim 6, further comprising an alarm responsive to the signal indicative of the marginal time greater than the preselected marginal time and the signal indicating the distance to the preceding vehicle is shorter than the stopping distance, to output an alarm signal to inform the driver of close proximity to the preceding vehicle.

9. A system as set forth in claim 8, wherein said fourth means provides the control signal to said fifth means for actuating said brake unit when said brake unit is not operated by the driver within a preselected period of time following output of the alarm signal.

10. A system as set forth in claim 5, further comprising a road condition sensor for sensing a condition of a road surface and for providing a road condition signal indicative of wet or dry road conditions, said fourth means being responsive to the road condition signal indicative of a dry road condition to determine a first stopping distance and being responsive to the road condition signal indicative of a wet road condition to determine a second stopping distance longer than the first stopping distance.

11. A system as set forth in claim 10, wherein said fourth means is responsive to the road condition signal indicative of the dry road condition from said road condition sensor to determine the first stopping distance based on the braking distance $L_1$, which is obtained according to a relation of $L_1 = A_D \times V^2$ where V is vehicle speed monitored by said first means and $A_D$ is a constant and responsive to the signal indicative of the first wet road condition from said road condition sensor to determine the second stopping distance $L_2$, longer than the first stopping distance which is obtained according to a relation of $L_2 = A_W \times V^2$ where V is vehicle speed monitored by said first means and $A_W$ is a constant greater than $A_D$.

12. A system as set forth in claim 10, wherein said road condition sensor is a wiper.

13. A system as set forth in claim 5, wherein said fourth means determines the braking distance L according to a relation of $L = A \times V^2$ where V is vehicle speed monitored by said first means and A is a constant.

14. A system as set forth in claim 13, wherein the constant A is defined by a minimum value which is obtained according to a relation of $A = L/V^2$ during braking operation carried out by the driver.

15. A system as set forth in claim 3, further comprising an alarm responsive to the signal indicative of the marginal time shorter than the preselected marginal time to output an alarm signal to inform the driver of close proximity to the preceding vehicle.

16. A system as set forth in claim 15, wherein the sixth means actuates the brake when the brake is not operated by the driver within a preselected period of time after the alarm signal is output.

17. A system as set forth in claim 3, further comprising a seat belt actuator for tightening a fastened seat belt when the marginal time determined by said fourth means is shorter than the preselected marginal time.

18. A system as set forth in claim 3, wherein said fourth means determines the marginal time T based on a minimum value obtained by a relation of $T = L/(V - V_F)$ where L is the distance to the preceding vehicle and $(V - V_F)$ is the relative speed monitored by said third means during braking operation.

19. A system as set forth in claim 3, wherein said fourth means further determines a stopping distance of the vehicle based on a minimum value of the distance between the system vehicle and the preceding vehicle monitored by said second means with respect to the vehicle speed monitored by said first means during braking operation, said fourth means being responsive to the signal indicative of the distance to the preceding vehicle monitored by said second means shorter than the stopping distance to provide the control signal for actuating the brake unit.

20. A system as set forth in claim 19, wherein said seventh means includes a memory for memorizing the minimum values of the distance between the system vehicle and the preceding vehicle monitored by said second means with respect to the vehicle speed monitored by said first means during the braking operation for determining the stopping distance with respect to the vehicle speed.

21. A system as set forth in claim 20, wherein said sixth means determines a minimum value of the marginal time during braking to be updated as the preselected marginal time.

22. A system as set forth in claim 21, wherein said seventh means includes a memory for memorizing the minimum values of the marginal time as the preselected marginal times associated with individual drivers, the system further comprising a selector for selecting the preselected marginal time for a particular driver.

23. A system as set forth in claim 22, wherein the preselected marginal time selected by the selector is multiplied by a value more than 1.0 to be updated as a new preselected marginal time.

24. A system as set forth in claim 20, wherein the minimum values of the distance between the system vehicle and the preceding vehicle are stored in the memory as the stopping distances associated with individual drivers, the system further comprising a selector for selecting the minimum value corresponding to a particular driver as the stopping distance.

25. A system as set forth in claim 24, wherein the stopping distance selected by the selector is multiplied by a value more than 1.0 to be updated as a new stopping distance.

26. A system as set forth in claim 1, wherein said fourth means is responsive to anti-collision action during an automatic braking operation to provide a control signal to said fifth means for releasing said brake unit.

27. A system as set forth in claim 26, wherein the anti-collision action is an acceleration operation effected by the driver, a steering operation over a preselected angle effected by the driver, or a turn indicator operation effected by the driver.

28. A system as set forth in claim 1, further comprising an alarm, and means for actuating said alarm when the system vehicle approaches the preceding vehicle within a distance obtained by multiplying a stopping distance by a preselected constant.

29. A system as set forth in claim 1, wherein said fourth means controls the brake unit with a preselected reduction ratio of vehicle speed with respect to the vehicle speed monitored by said first means.

30. A system as set forth in claim 1, further comprising a seat belt sensor for monitoring whether or not vehicle occupants fasten seat belts and for providing a seatbelt signal indicative thereof, said fourth means being responsive to the seatbelt signal from said seat belt sensor to provide the control signal to said fifth means for actuating the brake unit with a preselected reduction ratio when a vehicle occupant's seat belt is unfastened.

31. A system as set forth in claim 1, further comprising condition determining means for determining a condition wherein the driver intentionally brings the vehicle to a close proximity to the preceding vehicle, and
said fourth means including means for deactivating said fifth means when the condition determining means determines that the vehicle operator has intentionally driven the vehicle to a close proximity with the preceding vehicle.

32. A braking system for a vehicle comprising:
intervehicle distance detecting means for detecting an intervehicle distance to a preceding vehicle and for generating an intervehicle distance signal;
vehicle speed detecting means for detecting vehicle speed of a system vehicle incorporating said braking system and for generating a vehicle speed signal;
means receiving said intervehicle distance signal and said vehicle speed signal for activating an automatic braking unit responsive to said intervehicle distance detecting means and said vehicle speed detecting means;
driver learning means for learning a driver's driving characteristics;
means for detecting a condition wherein a driver intentionally brings the system vehicle close to the preceding vehicle and for generating a condition signal indicative thereof; and
receiving means receiving said condition signal and responsive to said driver learning means for inactivating said automatic braking unit when the driver intentionally brings the system vehicle close to the preceding vehicle,
said receiving means inactivating said automatic braking unit at a timing corresponding to the driver's driving characteristic learned by said driver learning means.

33. A system for a vehicle comprising:
intervehicle distance detecting means for detecting an intervehicle distance to a preceding vehicle and for generating an intervehicle distance signal;
vehicle speed detecting means for detecting vehicle speed of a system vehicle incorporating said braking system and for generating a vehicle speed signal;
means receiving said intervehicle distance signal and said vehicle speed signal for activating an automatic braking unit responsive to said intervehicle distance detecting means and aid vehicle speed detecting means;
means for detecting a condition wherein a driver intentionally brings the system vehicle close to the preceding vehicle and for generating a condition signal indicative thereof; and
means receiving said condition signal for inactivating said automatic braking unit when the driver intentionally brings the system vehicle close to the preceding vehicle, wherein said means detecting the condition wherein the driver intentionally brings the system vehicle close to the preceding vehicle operates to detect said condition within a preselected period of time following activation of an alarm.

34. A system for a vehicle comprising:
intervehicle distance detecting means for detecting an intervehicle distance to a preceding vehicle and for generating an intervehicle distance signal;
vehicle speed detecting means for detecting vehicle speed of a system vehicle incorporating said braking system and for generating a vehicle speed signal;
means receiving said intervehicle distance signal and said vehicle speed signal for activating an automatic braking unit responsive to said intervehicle distance detecting means and said vehicle speed detecting means;
means for detecting a condition wherein a driver intentionally brings the system vehicle close to the preceding vehicle and for generating a condition signal indicative thereof; and
means receiving said condition signal for inactivating said automatic braking unit when the driver intentionally brings the system vehicle close to the preceding vehicle, wherein said means detecting the condition wherein the driver intentionally brings the system vehicle close to the preceding vehicle operates for determining whether or not an intervehicle distance to the preceding vehicle after actuating an alarm is smaller than a preselected value.

* * * * *